(12) United States Patent
Uetaki

(10) Patent No.: US 11,810,464 B2
(45) Date of Patent: Nov. 7, 2023

(54) AIR RIGHTS MANAGEMENT SYSTEM

(71) Applicant: Ryohei Uetaki, Tokyo (JP)

(72) Inventor: Ryohei Uetaki, Tokyo (JP)

( * ) Notice: Subject to any disclaimer, the term of this patent is extended or adjusted under 35 U.S.C. 154(b) by 476 days.

(21) Appl. No.: 17/261,170

(22) PCT Filed: Jul. 18, 2018

(86) PCT No.: PCT/JP2018/026915
§ 371 (c)(1),
(2) Date: Jan. 18, 2021

(87) PCT Pub. No.: WO2020/016962
PCT Pub. Date: Jan. 23, 2020

(65) Prior Publication Data
US 2021/0280068 A1   Sep. 9, 2021

(51) Int. Cl.
*G08G 5/00* (2006.01)
(52) U.S. Cl.
CPC ............. *G08G 5/006* (2013.01); *G08G 5/003* (2013.01); *G08G 5/0013* (2013.01); *G08G 5/0026* (2013.01); *G08G 5/0069* (2013.01); *G08G 5/0086* (2013.01)
(58) Field of Classification Search
CPC .... G08G 5/006; G08G 5/0013; G08G 5/0026; G08G 5/003; G08G 5/0069; G08G 5/0086; G06F 16/909; G06Q 10/083; G06Q 50/18
See application file for complete search history.

(56) References Cited

U.S. PATENT DOCUMENTS

| | | |
|---|---|---|
| 2018/0014627 A1 | 1/2018 | Stevens |
| 2018/0025650 A1 | 1/2018 | Taveira |
| 2018/0165971 A1 | 6/2018 | Chen |

FOREIGN PATENT DOCUMENTS

| | | |
|---|---|---|
| JP | 2015-207149 A | 11/2015 |
| JP | 2017-077878 A | 4/2017 |
| JP | 2017-117017 A | 6/2017 |
| JP | 2017-119503 A | 7/2017 |
| JP | 2018-000015 A | 1/2018 |
| JP | 2018-18538 A | 2/2018 |
| WO | 2017/122278 A1 | 7/2017 |

*Primary Examiner* — Shon G Foley
(74) *Attorney, Agent, or Firm* — H&l PARTNERS LLC; Andrew Im; Jean-Christophe Hamann

(57) ABSTRACT

An air rights management system to enable a drone or other unmanned aerial vehicle to legally pass over owned land under permission of landowner. A management server includes an air rights management database, a customer data management database and a map server. The map server includes a map database, a display to output map image data and a graphical user interface configured to receive operation data from the controller as input is generated. In response to the user operating the controller to designate a region, an arithmetic processor acquires topographical data, building height data and housing display data, and registers creation of air rights in an air rights management main table of the air rights management database. Additionally, the arithmetic processor registers a set region and a set time period of the air rights in an air rights creation data table, and registers the customer data in the customer table.

3 Claims, 5 Drawing Sheets

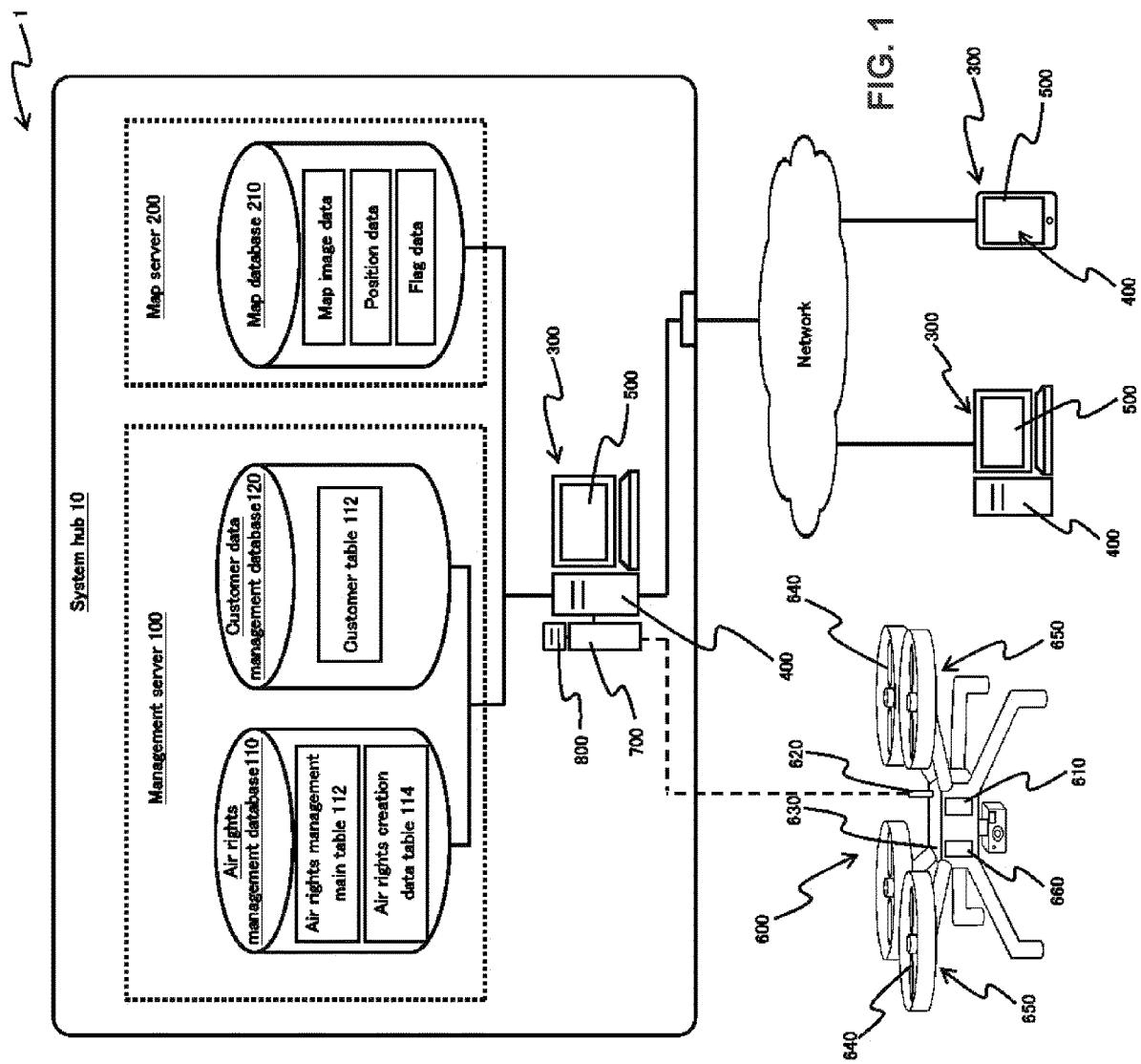

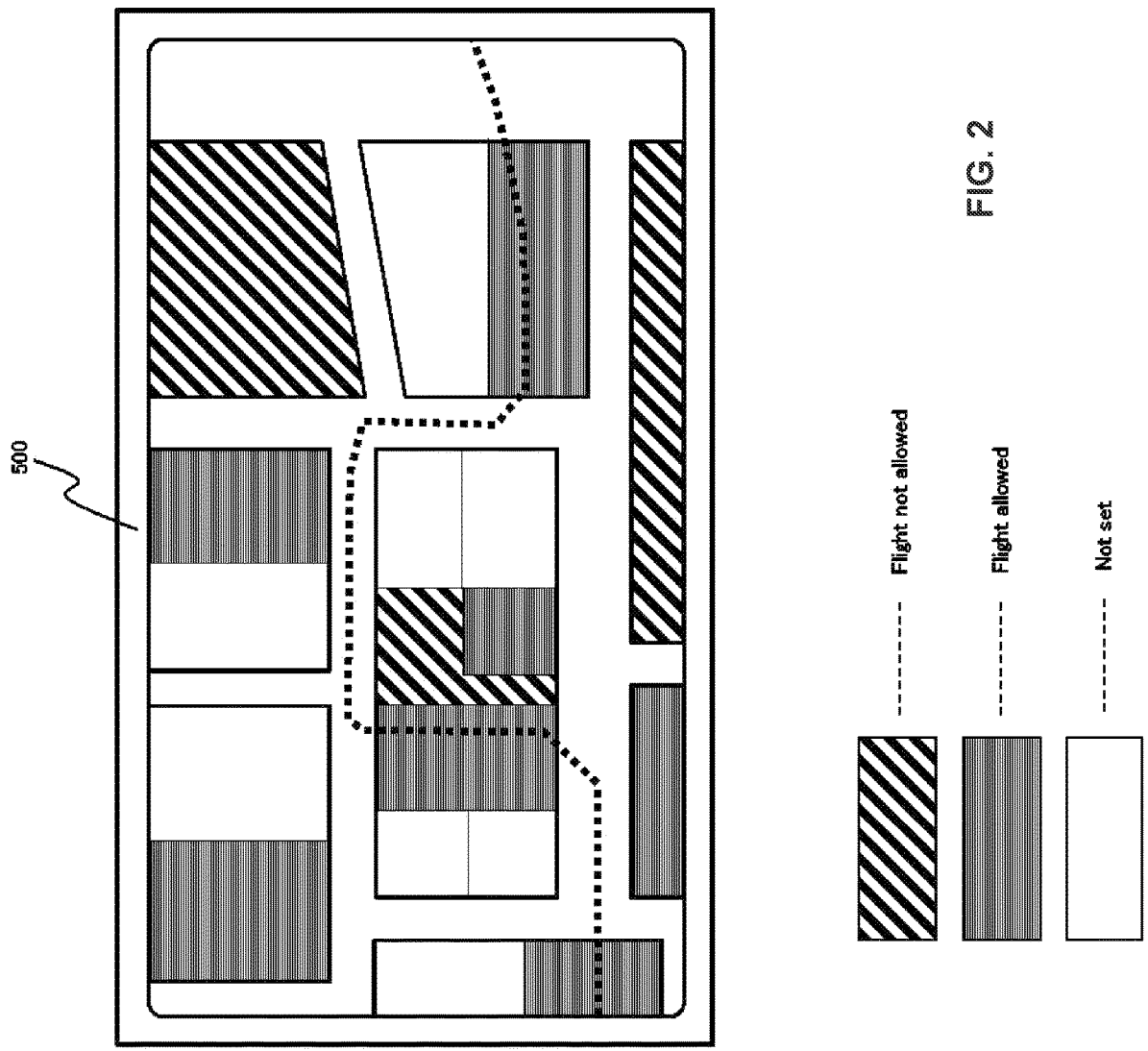

| Air rights ID | Customer ID | Date / time created | ..... |
|---|---|---|---|
| S000001 | C000121 | 2018/5/1 | ..... |
| S000002 | C000250 | 2018/6/1 | ..... |
| S000003 | C000312 | 2018/7/1 | ..... |
| S000004 | C001045 | 2017/4/1 | ..... |
| S000005 | C002020 | 2018/4/1 | ..... |

FIG. 3A

| Air rights ID | Set region | Set time period | Set details | |
|---|---|---|---|---|
| S000001 | xxx~xxx | 2018/5/1~2019/5/1 | Passage prohibited | ..... |
| S000002 | yyy~yyy | 2018/6/1~ | Conditionally allowed | ..... |
| S000003 | zzz~zzz | 2018/7/1~ | Allowed | ..... |
| S000004 | aaa~aaa | 2017/4/1~2020/5/1 | Allowed | ..... |
| S000005 | bbb~bbb | 2018/4/1~ | Allowed | ..... |

FIG. 3B

| Customer ID | Customer name | Age | Address | |
|---|---|---|---|---|
| C000121 | Sasaki | 50 | AA City, AA Prefecture | ... |
| C000250 | Tanaka | 35 | BB County, BB Prefecture | ... |
| C000312 | Sato | 75 | CC City, CC Prefecture | ... |
| C001045 | Yamamoto | 40 | DD Town, DD Prefecture | ... |
| C002020 | Nakamura | 30 | EE City, EE Prefecture | ... |

FIG. 3C

AIR RIGHTS MANAGEMENT SYSTEM

RELATED APPLICATIONS

This application is a § 371 application of PCT/JP2018/026915 filed Jul. 18, 2018, which is incorporated herein by reference in its entirety.

TECHNICAL FIELD

The present invention relates to an air rights management system for registering and managing information related to air rights to airspace of regions above land, particularly to an air rights management system for, when flying a drone or other unmanned aerial vehicle, enabling the drone or other unmanned aerial vehicle to legally pass over or take aerial photographs from above owned land under condition of having acquired permission of landowner concerned.

BACKGROUND OF THE INVENTION

It is already a common practice to wirelessly or otherwise fly an unmanned aerial vehicle through the air, such as for a business purpose or as a personal hobby, and many unmanned aerial vehicles capable of being flown wirelessly have been developed and put to use. Particularly in recent years, many small unmanned aerial vehicles, called drones, that are capable of easy wireless piloting and stable flight have been developed and utilized for various purposes including transport, photography and hobby flight applications.

Flying of unmanned aerial vehicles is subject to certain conditions from the viewpoint of safety. For example, aviation laws as a general rule prohibit flight around airports and the like, above densely populated areas and at altitudes above 150 meters, and as regards flight method, flying of an unmanned aircraft at an event and transport of hazardous items, to give a couple of examples, are prohibited in principle. Clearance or approval of the local civil aviation bureau director is required prior to flight. But cases not subject to these restrictions also exist, such as when total weight of the aerial vehicle frame and battery is under 200 grams or when the aerial vehicle is used for search and rescue purposes.

Moreover, since space above land sometimes falls within the scope of the rights of the owner or the like of the land concerned, there have been issues in that free, unconditional flying of an unmanned aerial vehicle is difficult even if flying becomes possible upon obtaining the aforesaid clearance or approval and in that the landowner may later make a complaint or demand that flight be prohibited. In the case of delivering a parcel, for example, the acquisition of permissions while flying a short or long distance and simultaneously operating an unmanned aerial vehicle from a remote location has been a major obstacle. And when taking photographs from an aloft unmanned aerial vehicle, serious problems regarding privacy may also arise owing to the possibility of the shots including views within landowners' premises and the like.

A technology for flying an unmanned aerial vehicle from a remote location is disclosed in JP2017-077878A, for example. This technology, which is directed to bringing an unmanned aerial vehicle home by expiration of permitted unmanned aerial vehicle flight time period, is a technology relating to an unmanned aerial vehicle comprising a time measurement unit for acquiring current time, a flyable range changing unit for determining a flyable range of the unmanned flight vehicle in accordance with time from expiration of permitted unmanned aerial vehicle flight time period to current time, and a flight control unit for controlling the unmanned aerial vehicle to fly within the flyable range.

This technology does indeed enable limitation of unmanned aerial vehicle flight time and make it possible to prevent or avoid the unmanned aerial vehicle from being flown during a time period contrary to landowner's intention, but situations in which entry into space above premises of a landowner who intends to prohibit the very fact of overhead flight also actually occur and cannot be prevented. The technology is therefore inadequate in the aspect of supporting legal overhead flight and aerial photography.

Moreover, as a technology relating to an unmanned aerial vehicle control device for restricting aerial photography by an imaging device, JP2017-119503A discloses a technology wherein an unmanned aerial vehicle authentication processing unit uses an imaging device communication unit for communicating with the imaging device to perform authentication with respect to the imaging device, determines whether the imaging device is an authorized device satisfying predetermined aerial photography requirements, and upon determining that the imaging device is not an authorized device, imposes operational restriction on predetermined functions of the aerial vehicle so as to disable the imaging device from performing aerial photography. The disclosure states to the effect that in a case where the imaging device is not an authorized device satisfying predetermined aerial photography requirements, this technology can restrict aerial photography by the imaging device.

This technology can indeed enable operations such as restriction of photography from aloft when the imaging device is not permitted to photograph predetermined locations, but whether such permission has been obtained is difficult to determine, so that a problem has remained in that even if the technology is implemented it cannot in its present state enable operation capable of supporting desired legal flight and aerial photography.

A need has therefore been felt for development of an air rights management related system for registering and managing right-related matters so that at the time of flying a drone or other unmanned aerial vehicle it becomes possible to legally pass over and perform aerial photography from above land of owners whose permission has been obtained.

Patent Document 1: JP2017-077878A
Patent Document 2: JP2017-119503A

OBJECT AND SUMMARY OF THE INVENTION

Problem to be Overcome by the Invention

An object of the present invention is to provide an air rights management system for registering and managing information related to air rights, particularly to an air rights management system for, when flying a drone or other unmanned aerial vehicle, enabling the drone or other unmanned aerial vehicle to legally pass over land having a landowner under condition of having acquired permission of landowner concerned or to obtain permission and legally take aerial photographs from above.

Means for Solving the Problem

In order to achieve the aforesaid object, the present invention air rights management system for securing and managing drone flight route is configured to comprise: a management server for registering and managing air rights; a map server for managing map data; controller for issuing processing instructions to said servers; arithmetic processor for performing arithmetic processing in accordance with processing instructions issued by the operation means; and output means for visually outputting data acquired from the servers, wherein the management server comprises an air rights management database for managing presence/absence of air rights of land concerned and a customer data management database for managing customer data, the map server comprises a map database containing topographical data, building height data and map image data including housing display data, the air rights management database comprises an air rights management main table for registering data related to creation, transfer, expiration and licensing of air rights and an air rights creation data table for registering set region and set period of air rights and the customer data management database comprises a customer table for registering customer data, in which air rights management system the output means outputs map image data of the map server, a graphical user interface capable of receiving operation data from the controller as input is generated, and, in response to user operating the controller to designate on the graphical user interface comprising the generated map image a region for which air rights are to be created, the arithmetic processor acquires topographical data, building height data and housing display data in the region designated, registers creation of air rights in the management main table of the air rights management database, additionally registers set region and set time period of the air rights in the air rights creation data table, and registers customer data in the customer table of the customer data management database.

Moreover, the air rights management system for securing and managing drone flight route is configured to further comprise: a small unmanned aerial vehicle equipped with a GPS receiver and transmitter and capable of hover flying in the air; receiver for receiving data transmitted from the small unmanned aerial vehicle; and alert generator for outputting alerts, wherein the small unmanned aerial vehicle uses the GPS receiver to acquire its own position in latitude and longitude, the transmitter outwardly transmits the same, and the receiver receives the position data of the small unmanned aerial vehicle transmitted by the transmitter and transfers the same to the arithmetic processor, the arithmetic processor registers the position data of the small unmanned aerial vehicle in the map database of the map server, displays the map image data of the map server and the registered position data on the output means and additionally acquires set region of the air rights from the air rights management main table and air rights creation data table of the air rights management database and displays the same on the output means, and the arithmetic processor responds to position data of the small unmanned aerial vehicle falling outside permitted region of air rights acquired from the air rights management main table and the air rights creation data table by registering a flag in the map database of the map server indicating that the small unmanned aerial vehicle is in a flight prohibited region and outputting an alert using the alert generator.

Moreover, a configuration is adopted whereby the arithmetic processor calculates flight distance and/or flight time period of the small unmanned aerial vehicle from position data of the small unmanned aerial vehicle recorded in the map database of the map server and outputs the same.

Effects of the Invention

Since the present invention is configured as described above, it achieves effects such as the following:

1. As a configuration is adopted that establishes an air rights management database and a customer database in a management server, registration of air rights creation data can be managed for each landowner (customer) individually. Moreover, the adoption of a configuration that cooperatively links a management server equipped with an air rights management database and a map server equipped with a map database enables air rights registered in the database to be checked visually on a map and, as such, facilitates planning of unmanned aerial vehicle flight routes.
2. Since the small unmanned aerial vehicle is equipped with a GPS receiver, map data output from the map database and air rights data output from the air rights management database can first be converted to GUI and position data of the small unmanned aerial vehicle can then additionally be visually overlaid thereon, thus enabling the small unmanned aerial vehicle to be flown remotely while visually selecting air rights-established regions. Moreover, owing to the provision of alert means, an alert can be output to call attention to the position data of the small unmanned aerial vehicle being outside permitted region of air rights.
3. Since the arithmetic processor is configured to calculate flight distance and/or flight time period of the small unmanned aerial vehicle, service charges can be calculated based on flight time period or flight distance, and/or tolls can be calculated as multiples of flight time or distance within range of created air rights.

BRIEF EXPLANATION OF THE DRAWINGS

FIG. 1 is a conceptual diagram of the air rights management system according to the present invention.

FIG. 2 is a diagram showing an example of use of the air rights management system.

FIG. 3A is a diagram showing an example of an air rights management main table.

FIG. 3B is a diagram showing an example of an air rights creation data table.

FIG. 3C is a diagram showing an example of a customer table.

DETAILED DESCRIPTION OF THE EMBODIMENTS

There now follows a detailed explanation of the air rights management system according to the present invention, based on an embodiment shown in the drawings. FIG. 1 is a conceptual diagram of the air rights management system according to the present invention, and FIG. 2 is a diagram showing an example of use of the air rights management system. FIG. 3a is a diagram showing an example of an air rights management main table, FIG. 3b is a diagram showing an example of an air rights creation data table, and FIG. 3c is a diagram showing an example of a customer table.

As shown in FIG. 1, an air rights management system 1 according to the present invention comprises a processor-based management server 100, a processor-based map server 200, operation means 300, arithmetic processor 400, output means 500, a small unmanned aerial vehicle 600 such as a drone, a receiver 700 and alert generator 800, and is a system for registering and managing air rights that, by registering and managing air rights related data, enables securement and registration of flight route of the small unmanned aerial vehicle 600 so that when the small unmanned aerial vehicle 600 is flown, it is flown legally with permission of landowner(s) who own airspace over their land having been obtained. Air rights in this context indicate mainly ones that are rights to use part or all of airspace above land and are established privately by contract between landowner and person desiring to use overhead airspace.

The management server 100, serving as the core equipment of the air rights management system 1 according to the present invention, is a main server performing arithmetic processes for registering, storing, managing and utilizing data related to air rights. The management server 100 can be configured as a single unit, but taking into account that it needs to perform numerous processing tasks and requires high performance, the management server 100 is preferably configured to be capable of performing distributed processing and the like with multiple server computers. Moreover, although the server or server group can be installed in a data center or similar constituting a system hub 10, it is preferable from the viewpoint of data management security and simplicity of system operation and maintenance to instead use a data management method employing cloud computing technology for server cloud migration.

The map server 200 is a server for registering, managing and outputting map data for use as GUI tool by the air rights management system 1. The map server 200 can also be configured as a single unit, but since it needs to perform numerous processing tasks and requires high performance, it is preferably configured to be capable of performing distributed processing and the like with multiple server computers. Moreover, it is also possible to install the server in the data center or the like constituting the system hub 10, but owing to the likely difficulty for the system hub 10 itself to store and update the map data contained in the map server 200, it is of course possible to adopt a configuration that acquires map related data themselves using various map data services via the Internet and stores other data in the map server 200. In addition, a configuration is possible that stores all data using various cloudified map data services via the Internet.

The controller 300 is means for issuing processing instructions to the servers, and while in this embodiment is configured as shown in FIG. 1 to comprise, inter alia, one or multiple client PCs, tablet PCs, smartphones or the like interconnected with the management server 100 and the map server 200 via LAN or the Internet, it is not limited to this configuration and, for example, the management server 100 or map server 200 and the controller 300 can be integrated and the controller 300 be configured to directly operate the management server 100. Alternatively, a configuration can be adopted whereby a controller for directly operating the management server 100 and the map server 200 is installed and the management server 100 or map server 200 is directly operated by a controller 300 comprising one or multiple client PCs accessing the installed computer. In addition, it is possible to adopt a configuration whereby the controller 300 is connected to the management server 100 and the map server 200 via a wired or wireless network, and adoption of an open configuration installed at remote locations using the Internet or other connection to enable wide use by general users is of course also possible.

The arithmetic processor 400 is means for extracting (or similar) and arithmetically processing data from the servers in response to processing instruction output by the controller 300, and in the present embodiment the arithmetic processor 400 can be of any configuration suitable for the scale of the air rights management system 1, such as one selected from among a configuration comprising a processing unit, memory unit and so on installed in the controller 300 formed of a computer, a laptop and the like, a configuration comprising a processing unit, memory unit and so on installed in the management server 100 or the map server 200, or a configuration obtained by providing a controller comprising a separate processing unit, memory unit and the like and establishing the arithmetic processor 400.

The output means 500 is means for visually outputting data acquired from the servers, and in the present embodiment is configured as a display connected to or installed in the controller 300, but is not limited to a display and an alternative can be suitably selected for use instead insofar as one capable of making output data visible.

As shown in FIG. 1, the management server 100 has a configuration incorporating an air rights management database 110 and a customer data management database 120. The air rights management database 110 is a database for storing and managing presence/absence of land air rights registration, and the customer data management database 120 is a database for managing customer data related to air rights registrations. Further, the map server 200 incorporates a map database 210 comprising map image data including topographical data, building height data and housing display data. Although these databases are configured as relational databases in the present embodiment, they are not limited to such and can also be configured as other types of databases.

In the present embodiment, the air rights management database 110 comprises an air rights management main table 112 and an air rights creation data table 114. As shown in FIG. 3*a*, the air rights management main table 112 is a memory area (table) for registering data related to creation, transfer, expiration and licensing of air rights. As shown in FIG. 3*b*, the air rights creation data table 114 is a memory area (table) for registering set region, set time period and other detailed data regarding air rights. As shown in FIG. 3*c*, the customer data management database 120 comprises a customer table 122 including a memory area (table) for registering various customer related data. These tables are normalized to establish mainly one-to-one or one-to-many relationships.

There now follows an explanation of operation of the air rights management system 1. In the air rights management system 1 according to the present invention, the arithmetic processor 400 outputs map image data stored in the map database 210 of the map server 200 to user's output means 500 constituted as a display or the like. As a result, range of created air rights and other input become easily visually viewable via a generated graphical interface, so that user can easily input data by operating the controller 300.

User (i.e., landowner) uses the controller 300 to designate air-rights granted regions on the graphical user interface including generated map images. Specifically, user for example uses a mouse or other pointing device, a touch panel, or some other input means to designate ranges to be granted air rights by surrounding them on map images displayed on a screen. The map data consist of topographical data, height data, housing display data and other such data embedded and registered in advance. The arithmetic processor 400 therefore acquires actual topographical data, building height data, housing display data and other such data of the regions designated on the map.

After the arithmetic processor 400 acquires topographical data, height data, housing display data and the like of the designated region(s) in this manner, the arithmetic processor 400 registers air rights ID, customer ID, creation date/time and other basic air rights creation data in the air rights management main table 112 of the air rights management database 110. As a result, basic data regarding presence/absence of air rights creation are registered.

Further, the arithmetic processor 400 registers data related to, inter alia, set region, set time period, established content details and the like of air rights associated with air rights ID in the air rights creation data table 114. In addition, the arithmetic processor 400 registers customer data related to customer ID and customer name, age, address and the like in the customer table 122 of the customer data management database 120. As a result of the foregoing, data regarding air rights come to be registered in the air rights management system 1, whereby operations related to air rights utilization can be performed based on these data, particularly when the data are used during flight of an unmanned aerial vehicle.

The air rights management system 1 according the present invention is configured to comprise the small unmanned aerial vehicle 600, the receiver 700 and the alert generator 800. The small unmanned aerial vehicle 600, which is a wirelessly controllable aerial vehicle capable of hovering, navigating, flying and stopping in the air, comprises a frame 630, rotors 640 comprising multiple fans mounted on the frame 630, multiple drive units 650 for imparting rotational power to the rotors 640, and a control unit 660 for controlling the drive units 650 in order to stabilize airborne attitude of and fly the frame 630 in desired direction. In the present embodiment, a small or medium sized drone equipped with the multiple rotors 640 is used but this is not a limitation and another device of suitable structure can be selected for use insofar as capable of flying and stopping in the air. The small unmanned aerial vehicle 600 is configured to be flown by an operator of the small unmanned aerial vehicle 600 while monitoring established air rights data displayed on the output means 500.

As shown in FIG. 1, the small unmanned aerial vehicle 600 is configured to comprise a GPS receiver 610 and transmitter 620. The GPS receiver 610 is a device that receives signals from GPS satellites and can measure its own position data (latitude and longitude), whereby the small unmanned aerial vehicle 600 acquires its own position data consisting of latitude-longitude data. The transmitter 620 is means for outwardly transmitting data wirelessly or by wire and in the present embodiment uses wireless communication equipment to outwardly transmit position data acquired from the GPS receiver 610.

The receiver 700 is means for receiving data transmitted wirelessly or by wire from the transmitter 620 of the small unmanned aerial vehicle 600, and in the configuration of the present embodiment is installed in a computer incorporating the arithmetic processor 400 of the air rights management system 1 (e.g., in the management server 100, map server 200, or controller 300) or in another computer connected through a network to the computer incorporating the arithmetic processor 400. Upon receiving position data of the small unmanned aerial vehicle 600 transmitted from the transmitter 620, the receiver 700 sends the same to the arithmetic processor 400.

The arithmetic processor 400 registers position data of the small unmanned aerial vehicle 600 transmitted from the transmitter 620 in the map database 210 of the map server 200. As transmission of position data of the small unmanned aerial vehicle 600 is received sequentially, flight route of the small unmanned aerial vehicle 600 can be recorded by successively registering the position data, thus making it possible to track what kind of route was followed.

Moreover, as shown in FIG. 2, the arithmetic processor 400 displays map image data of the map server 200 on the output means 500 and performs processing for plotting locations corresponding to the position data of the small unmanned aerial vehicle 600 on said map image data. As a result, current position information and flight route of the small unmanned aerial vehicle 600 can be visually confirmed. Optionally, a configuration can be adopted that is responsive to desire of the person granting air rights for positively displaying flyable regions at this time. As this clearly identifies regions over which the small unmanned aerial vehicle 600 can be freely flown, it enables practice flights and other activities of the small unmanned aerial vehicle 600 to be aggressively pursued.

Furthermore, the arithmetic processor 400 acquires established air rights region data from the air rights management main table 112 and air rights creation data table 114 of the air rights management database 110, performs arithmetic processing for calculating map regions corresponding to the acquired region data, and performs processing for superimposed display of the calculated map regions on the map image data of the map server 200 displayed on the output means 500, as shown in FIG. 2. Since map regions where air rights are established can therefore be additionally displayed superimposed on the map image data plotted with the flight route of the small unmanned aerial vehicle 600, whether the small unmanned aerial vehicle 600 is flying over air rights-established land can be visually ascertained in real time.

The arithmetic processor 400 is configured to issue an instruction to output an alert when position data of the small unmanned aerial vehicle 600 are outside permitted region of air rights. The arithmetic processor 400 receives position data of the small unmanned aerial vehicle 600 from the receiver 700 in real time and simultaneously acquires air rights-established region data from the air rights management main table 112 and air rights creation data table 114 of the air rights management database 110. When position data of the small unmanned aerial vehicle 600 are outside air rights-established region or when inside entry-unpermitted air rights-established region, the small unmanned aerial vehicle 600 is determined to be outside air rights-established region and a flag indicating that the small unmanned aerial vehicle 600 is in an unflyable region is registered in the map database 210 of the map server 200. The present embodiment is configured to concurrently register flag registration date and time and also concurrently register flag expiration date and time. This arrangement enables calculation of flight route and time period of the small unmanned aerial vehicle 600 within range of permitted region of air rights, and the calculated route and time period can be adopted as a basis for, inter alia, calculating compensation for flight within range of permitted region of air rights.

In addition, the arithmetic processor 400 is configured to instruct the alert generator 800 to output an alert simultaneously with registration of the aforesaid flag. The alert generator 800 is means for outputting alerts in accordance with instruction from the arithmetic processor 400, and while the present embodiment adopts a configuration by which alert information is output to the output means 500 in the form of characters, figures or the like, it is not limited thereto and can alternatively adopt a configuration that outputs alert information in the form of sound, vibration or similar, or otherwise adopt a configuration that outputs alerts in the form of sound, vibration or similar to a small unmanned aerial vehicle 600 wireless operating device (not shown) comprising a proportional RC system or the like.

The aforesaid configuration makes it possible when flying the small unmanned aerial vehicle 600 to fly it legally over land of another party or parties. As an implementation of the air rights management system 1 according to the present invention, the air rights management system 1 is publicized on the Internet and landowners wishing to establish (allow or disallow) air rights use the controller 300 to access the air rights management system 1 via the Internet and perform registration processing with respect to air rights associated with land displayed on the output means 500. Namely, they perform registration with regard to whether flight of the small unmanned aerial vehicle 600 above land they own is permitted or not permitted.

Optionally, this registration can allow registration of flyable date and time, day of the week, hours of the day and so on. Further, a configuration can be adopted that sets compensation per period of flight time as a condition for flight permission. Moreover, a configuration can optionally be adopted that, at time of air rights registration, determines, on the system hub 10 side of the air rights management system 1 including the management server 100 and map server 200, whether to approve the air rights registration.

Operator of the small unmanned aerial vehicle 600 uses the controller 300, which is a personal computer, laptop, tablet PC, smartphone or the like, to access the air rights management system 1 and visually acquire and confirm map image data and data regarding air rights-registered regions displayed on the output means 500. As this enables confirmation of small unmanned aerial vehicle 600 flyable regions, regions requiring payment of compensation for flying the small unmanned aerial vehicle 600 and regions where flying of the small unmanned aerial vehicle 600 is prohibited, operator of the small unmanned aerial vehicle 600 can draw up a flight plan for the small unmanned aerial vehicle 600.

If during flight, the small unmanned aerial vehicle 600 should enter an aerial vehicle 600 flight prohibited region, the alert generator 800 outputs an alarm, thus making it possible to immediately withdraw or avoid entry. Moreover, an avoidance device can be installed in advance for ensuring that the small unmanned aerial vehicle 600 does not enter flight prohibited regions. Owing to the aforesaid measures, the small unmanned aerial vehicle 600 comes to be legally flyable over other party's land with no risk of complaints. Moreover, an automatic aerial photography interrupt means can be installed in addition.

The arithmetic processor 400 is configured to use position data of the small unmanned aerial vehicle 600 registered in the map database 210 of the map server 200 to calculate flight distance and flight time period of the small unmanned aerial vehicle 600. This arrangement makes it possible to calculate service charges in accordance with flight time period or flight distance, and/or to calculate tolls as multiples of distance or time period flown within range of created air rights, whereby the air rights management system 1 can be configured to be highly convenient. Optionally, the arithmetic processor 400 can be configured to calculate and output flight altitude data of the small unmanned aerial vehicle 600. By this it becomes possible, for example, to calculate tolls in accordance with altitude of the small unmanned aerial vehicle 600 during flight through range of created air rights.

EXPLANATION OF SYMBOLS

1 Air rights management system
10 System hub
100 Management server
110 Air rights management database
112 Air rights management main table
114 Air rights creation data table
120 Customer data management database
122 Customer table
200 Map server
210 Map database
300 Controller
400 Arithmetic processor
500 Output means
600 Small unmanned aerial vehicle
610 GPS receiver
620 Transmitter
630 Frame
640 Rotors
650 Drive unit
660 Control unit
700 Receiver
800 Alert generator

The invention claimed is:

1. An air rights management system to secure and manage a drone flight route, comprising:

a processor-based management server to register and manage air rights;

a processor-based map server to manage managing map data;

a controller to issue processing instructions to the management server and the map server;

an arithmetic processor to perform arithmetic processing in accordance with processing instructions issued by the controller;

a display to visually outputting data acquired from the management server and the map server;

wherein the management server comprises an air rights management database to manage presence or absence of air rights of a land at issue and a customer data management database to manage customer data;

wherein the map server comprises a map database comprising map image data, the map image data comprising topographical data, building height data and housing display data;

wherein the air rights management database comprises an air rights management main table to register data related to creation, transfer, expiration and licensing of air rights and an air rights creation data table to register a set region and a set time period of the air rights, and the customer data management database comprises a customer table to register customer data;

wherein the display outputs map image data of the map server;

a graphical user interface configured to generate a map image and to receive operation data from the controller as input is generated; and wherein in response to a user operating the controller to designate a region for which air rights are to be acquired on the generated map image, the arithmetic processor:

acquires topographical data, building height data and housing display data in the region designated;

registers acquisition of air rights of the region designated in the air rights management main table of the air rights management database;

registers the region designated as the set region and a time period of the air rights of the region designated as the set time period in the air rights creation data table; and registers the customer data of the user in the customer table of the customer data management databases;

an unmanned aerial vehicle (UAV) equipped with a GPS receiver and a transmitter, the UAV configured to hover in the air and to fly according to acquired air rights;

a receiver to receive data transmitted from the UAV; and
an alert generator to output alerts;
wherein:
   the GPS receiver of the UAV is configured to acquire its own position in latitude and longitude, and the transmitter outwardly transmits the position data;
   the receiver receives the position data of the UAV transmitted by the transmitter and transfers the position data to the arithmetic processor;
   the arithmetic processor registers the position data of the UAV in the map database of the map server, displays the map image data of the map server and the registered position data on the display, acquires a permitted region of the air rights from the air rights management main table and air rights creation data table of the air rights management database, and outputs the established region of the air rights on the display; and
   the arithmetic processor responds to the position data of the UAV falling outside the permitted region of the acquired air rights from the air rights management main table and the air rights creation data table by registering a flag in the map database of the map server indicating that the UAV is in a flight prohibited region and instructing the alert generator to output an alert.

2. The air rights management system of claim 1, wherein the arithmetic processor calculates at least one of a flight distance and a flight time period of the unmanned aerial vehicle from the position data of the unmanned aerial vehicle recorded in the map database of the map server and outputs said at least one of the flight distance and the flight time period.

3. The air rights management system of claim 1, wherein the controller is a computer, laptop, tablet, or smartphone.

* * * * *